Sept. 16, 1969   P. N. ADAMS   3,467,943
PIPE CLAMP DEVICE
Original Filed April 1, 1963   2 Sheets-Sheet 1
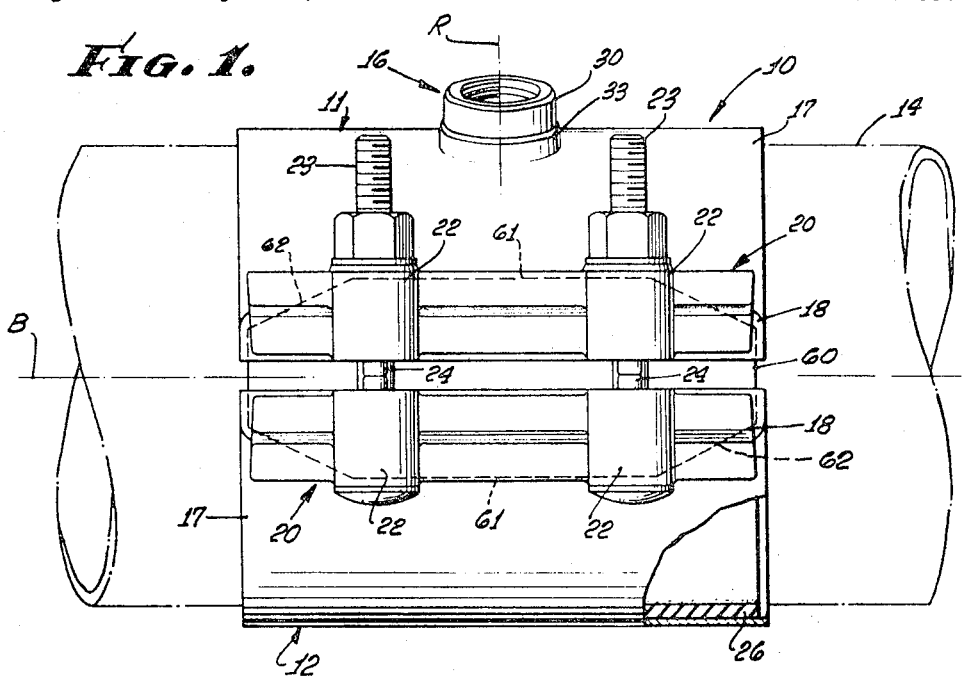
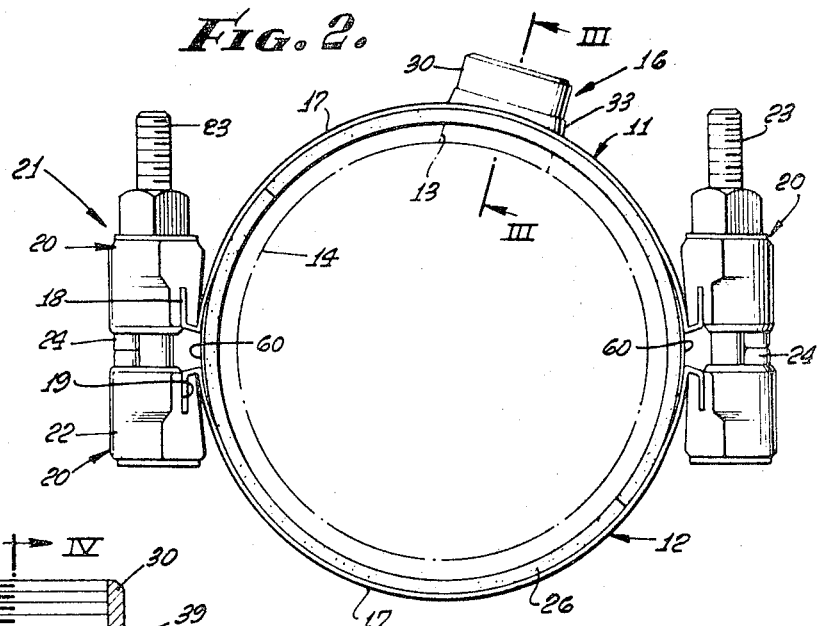
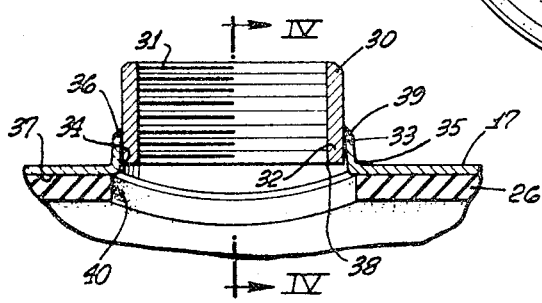
INVENTOR.
PHILLIP N. ADAMS
BY Cashman, Darby & Cushman
ATTORNEYS Sept. 16, 1969   P. N. ADAMS   3,467,943
PIPE CLAMP DEVICE Original Filed April 1, 1963   2 Sheets-Sheet 2

INVENTOR.
PHILLIP N. ADAMS
BY Cushman, Darby & Cushman
ATTORNEYS

# United States Patent Office 3,467,943
Patented Sept. 16, 1969

3,467,943
PIPE CLAMP DEVICE
Philip N. Adams, West Covina, Calif., assignor, by mesne assignments, to Mueller Co., Decatur, Ill., a corporation of Illinois
Original application Apr. 1, 1963, Ser. No. 269,605, now Patent No. 3,355,794, dated Dec. 5, 1967. Divided and this application May 15, 1967, Ser. No. 671,507
Int. Cl. F02m 45/10
U.S. Cl. 339—95                                8 Claims

ABSTRACT OF THE DISCLOSURE

The service outlet is a flexible band having an outlet member welded to an upset peripheral wall integral with the band. The band is installed by clamping it about the pipe. Other features include a gasket member associated with the metal band so that edge portions of the band will serve to limit flow of the resilient material of the gasket member when the clamp is tightened; the provision of a metal shim having a specific configuration adapted to facilitate tightening of the clamp means with respect to the relationship of the gasket member, shim and band; and button means carried by the gasket member for electrical conductive relation between a pipe and the band whereby electrical conductivity between adjacent pipe ends or through the pipe clamp device is assured.

---

This application is a division of Ser. No. 269,605, filed Apr. 1, 1963, and now Patent No. 3,355,794.

This invention relates generally to pipe repair clamp means of flexible band type and more particularly to a pipe repair clamp means providing a service outlet on the flexible band and useful on thin wall pipe as well as other pipe constructions.

Fluid distribution systems employing main pipe lines for conducting gas and liquid fluids under pressure must often be connected with facilities by means of service pipe lines of smaller diameter than the main line. Since the precise location of the service line may not be known at the time the main line is laid, various means have been proposed to facilitate the connection of the service line to the main line at a selected point with minimum disturbance of the main line.

Prior proposed service outlet devices have included rigid cast metal clamps adapted to fully encircle a main pipe line and made in two or more parts. Another prior device partially encircled the main pipe line and included a ported rigid saddle member and a strap or preformed rods used to complete encirclement of the pipe and to attach the saddle to the pipe. Such rigid devices are of course limited for use on pipe of specific size and diameter. When such rigid outlet devices are used on pipe of a size other than that for which the device was intended and dimensioned, various undersirable stress and pressure points are set up in the pipe and ultimately may cause a pipe break. Moreover, in such service outlet devices non-uniformity of pressure or stress distribution in the main pipe line is further emphasized when the clamp means is tightened because of such prior construction of the service outlets. Use of such rigid devices on thin wall pipe often resulted in crushing of the thin walls.

Prior mounting arrangements of a service outlet member on a flexible band have heretofore caused difficulty because the outlet member was specially constructed and the band required special deformation to accommodate such outlet member. Usually gaskets, washers, lock nuts, and the like were used to attempt to provide a tight leak-proof outlet connection. Tight, complete sealing of said prior flexible band service outlets was difficult and when applied to thin wall pipe such special constructions enhanced the chance of crushing the thin wall pipe.

The present invention contemplates a flexible band service outlet means which obviates prior disadvantages associated with such outlet devices and particularly those embodying flexible band means. Advantages of a flexible band service outlet for some installations is readily apparent since a flexible band adapts itself to various discrepancies and irregularities in pipe diameters and sizes. Further, virtually uniform pressure can be applied to the circumference of a pipe by a flexible service outlet clamp means embodying this invention and the construction and arrangement of the service outlet connection with the flexible band provides a rigid completed sealed connection which does not subject metal of the band to stress fractures at the outlet connection.

The primary object of this invention, therefore, is to disclose and provide a novel service outlet connection for fiexible band clamp means and embodying a simple effective clean leakproof connection.

An object of the invention is to disclose a method of making a service outlet connection on a flexible metal band to provide an effective simply-applied service outlet.

Another object of the invention is to disclose and provide a flexible band service outlet device having an unusually clean and effective design and construction embodying a minimum number of parts and being inexpensive to manufacture.

Still another object of this invention is to disclose and provide a novel service outlet of flexible band type wherein an outlet member is welded to an upset wall integral with the band.

Other objects of the invention include the provision of a flexible band type clamp device having a gasket member associated with the metal band so that edge portions of the band will serve to limit flow of the resilient material of the gasket member when the clamp means is tightened; the provision of a metal shim having a specific configuration adapted to facilitate tightening of the clamp means with respect to the relationship of the gasket member, shim and metal band; and button means carried by the gasket member for electrical conductive relation between a pipe and the metal band whereby electrical conductivity between adjacent pipe ends or through the pipe clamp device of this invention is assured.

The present clamp means has utility with a tapped hole if a service connection is mis-threaded or when a corporation stop threaded in said hole is overtightened and the pipe is broken. In such instances, the clamp means of this invention may be installed on the main pipe and the defective tapped hole used as an access hole for communication of fluid from the main pipe to the service connection afforded by the present clamp means.

The clamp means of the present invention also has utility when it is directed to re-establish or restore service when a service connection has been broken, damaged or destroyed by various causes, one, for example, being destruction of the pipe at the service connection by a trenching or ditch digging machine. Assuming that the main pipe is broken at the service connection, the present clamp means may be readily and easily used to restore such service connection by installing the present clamp means at the destroyed service connection since the present pipe clamp means incorporates a full, complete seal about the main broken pipe.

Many other objects and advantages of the present invention will be readily apparent from the following description of the drawings in which exemplary embodiments of the invention are shown.

In the drawings:

FIG. 1 is a side elevational view of a pipe clamp means embodying this invention.

FIG. 2 is an end view of FIG. 1.

FIG. 3 is a fragmentary enlarged sectional view taken in the plane indicated by line III—III of FIG. 2.

Figure 4:
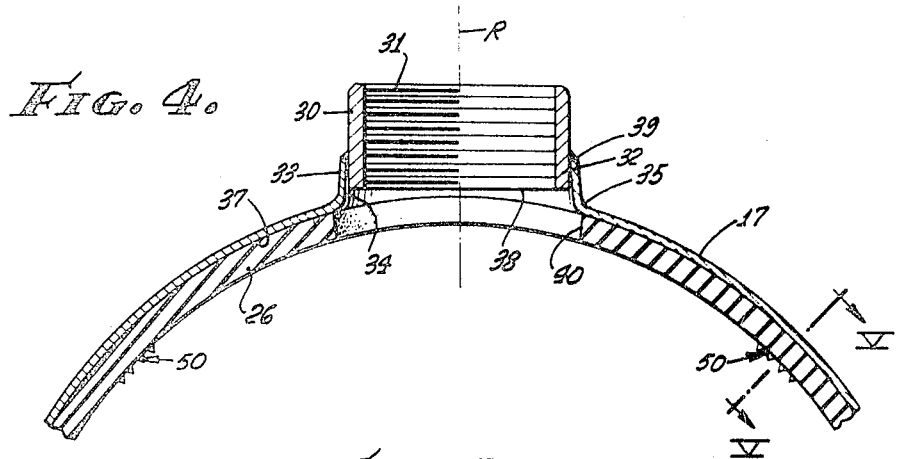
FIG. 4 is a sectional view taken in the plane indicated by line IV—IV of FIG. 3.

The drawings show an example of my invention as applied to a pipe repair clamp generally indicated at 10 comprisings two parts 11 and 12 adapted to fully encircle and seal an opening 13 in a main pipe line 14, the opening 13 and line 14 being indicated in phantom lines. It will be understood that the pipe line 14 may be of thin wall section as illustrated or may be of other well-known pipe sections and pipe materials. While the device 10 is shown in two parts, it will be understood that the invention described hereafter may be incorporated in pipe repair or clamping devices of one part or a plurality of parts.

Parts 11 and 12 of device 10 are similarly constructed except for the service outlet means generally indicated at 16 on part 11. For clarity and brevity like reference numerals will be applied to like elements of parts 11 and 12. Each part comprises a metal band 17 of selected width and length and made of a suitable rust resistant, non-corrosive metal material such as bronze or stainless steel. Each band 17 is curved to provide a generally semi-cylindrical portion having a radius of curvature corresponding to the outer radius of the cylindrical external surface on pipe 14. At each end band 17 has a return flange 18 adapted to be fixedly held in a slot 19 provided in a clamp member 20 of the pipe clamping means generally indicated at 21. Each clamp member 20 extends for substantially the entire width of band 17 and may be provided with longitudinally spaced bosses 22 ported for reception of nut and bolt assemblies 23 for drawing adjacent clamp members toward each other to tighten bands 17 about a pipe 14. Each clamp member may be provided with a projecting abutment lug 24 on each boss 22 serving as stops to prevent overtightening of the bands 17 and to provide axial alignment of the ported bosses and bolt 23 during final tightening stages. Other arrangements of clamp members and nut and bolt assemblies may be employed.

The device 10 also includes a gasket member 26 bonded by suitable adhesive or bonding materials to the internal surface of each metal band 17. One end of each gasket member 26 projects beyond clamp member 20 associated with its band 17 so as to underlie the adjacent portion of the adjacent band 17 of the other part of the device 10 so that the joint line between two adjacent ends of gasket members 26 will not occur beneath the spaced ends of adjacent bands 17. The joint line of gasket members 26 may be any suitable shape or configuration such as interlocked fingers or tapered sections so that the gasket members 26 may fully completely encircle and seal against the cylindrical surface of pipe 14.

The present invention is directed primarily to the construction and method of making the service outlet means 16. Service outlet means 16 comprises a cylindrical outlet member 30 of selected metal material and having internal threads 31. The outlet member 30 has an inner portion 32 inserted within an upstanding upset wall 33 integral with band 17 and providing a circular opening 34 for reception of member 30. Upset wall 33 has a fillet 35 of uniform radius joining upset wall 33 to the main portion of band 17. Top edge face 36 of upset wall 33 lies in a plane normal to a radius R of the opening 34 and common to the axis of cylindrical member 30. The inner end portion 32 of outlet member 30 is positioned in spaced relation to a projection of the internal surface 37 of the band 17 so that the inner edge face 38 of outlet member 30 cannot contact or bear against the surface of pipe 14. Outlet member 30 is secured and fixed to upset wall 33 by a weld 39 at the top edge face 36 and the adjacent surface of member 30.

While the drawings illustrate a slight opening between the bottom edge face 32 and the adjacent internal surface of upset wall 33, the outlet member is inserted into the upset wall in press fitting relationship so that outlet member 30 is frictionally, tightly held during the welding and a permanent completely sealed connection is made between outlet member 30 and upset wall 33 of band 17.

Gasket member 26 is provided with a port 40 aligned with opening 34 and port 13 in the pipe 14.

Figure 7:
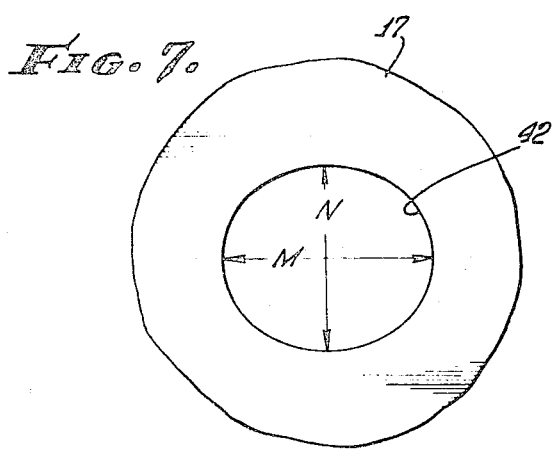
FIG. 7 is a fragmentary plan view of a metal band having an elliptical hole stamped therein in accordance with the method of this invention.

The method of making the service outlet means 16 is also an important part of this invention and the method of forming the upset wall 33 to define openings 34 of various size and diameter while permitting selected curvature of band 17 to accommodate pipes 14 of a size varying from small pipe such as two inch ID to large pipe such as six to 12 inches ID will now be described. A band 17 may be precut to selected length depending upon the diameter of the pipe to which it is to be applied. While band 17 lies in a plane, the hole 42 (FIG. 7) is stamped therein. The shape of hole 42 varies depending upon the diameter of the outlet member 30 to be secured therein. For outlets greater than ¾ of an inch, hole 42 becomes elliptical in shape with the major diameter or dimension M lying parallel to the axis of device 10 or pipe 14 or transversely of band 17. The minor dimension or diameter N is so related to the major diameter M that the ultimate opening 34 will be circular in shape. As the ultimate size of the outlet opening 34 increases in diameter, the major dimension M increases at a rate greater than the increase in the minor dimension N of the stamped elliptical opening. The relationship of the size of the outlet opening to major and minor dimensions is illustrated exemplarily in the following table:

| Final outlet size (in.) | Upset die diameter (in.) | Major dimension (in.) | Minor dimension (in.) |
| --- | --- | --- | --- |
| 2 | 2⅛ | 2¾ | 1⅞ |
| 1½ | 2⅛ | 2⅝ | 1⅝ |
| 1 | 1¾ | 1⁵⁄₁₆ | 1³⁄₁₆ |
| ¾ | 1½ | 1⅛ | 1⅛ |

The die size given above is for the die which provides the upset wall 33 as later described. It should be noted that the radius of curvature of band 17 has not been indicated in the above table and that it has been found that the above exemplary dimensions will provide a desired upset wall 33 without relating the same to radius of curvature.

After a hole 42 of selected size has been stamped from band 17, band 17 may be passed through forming rolls which will roll the band into a curved band having a preselected radius of curvature for the size of pipe for which the band is intended. After the band 17 has been so rolled, the curved band may be positioned with respect to an upset die (not shown) having a selected diameter as indicated in the above table. The upset die forms the upset wall 33 by forming upwardly edge margins of band 17 which surround and define the selected opening 42. The diameter of the upset die is so selected that the height of the upset wall 33 will be about one-quarter inch and the selected shape of opening 42 will be such that when the selected upset die is pressed therein, upset wall 33 will lie generally parallel to radius R and top edge face 36 will lie in a plane normal to radius R. The forming of the metal by the upset die also provides a fillet of uniform radius between upset wall 33 and band 17 and in such a manner that stress fractures or cracks are eliminated. It is also important to note that the shape of the elliptical opening 42 cooperates with the selected dies so that during the upset forming operation the metal at the margins of the opening is not torn or stretched to weaken the metal forming the upset wall or the fillet.

Cylindrical outlet member 30 is then pressed into the opening 34 of the upset wall 33 until its inner end portion is spaced above the projection of the internal surface 37 of the band 17. Outlet member 30 is thus tightly, frictionally held by the upset wall. The top edge face 36 and the upper portion of the upset wall 33 may then be welded to the adjacent cylindrical surface of the outlet member 32 by any suitable welding method such as fusion welding. The weld 39 thus formed not only rigidly interconnects member 30 with band 17 but also serves to provide a tight sealed leakproof connection between member 30 and band 17.

The method of forming the upset wall 33 to provide the rigid welded connection with outlet member 30 provides an essentially integral structure with the band which is not subject to stress cracks in the metal band around upset wall 33 when the clamp means is tightened. Tightening of bolt and nut assemblies 21 imparts tension forces to band 17, such tension forces tending to distort the opening 34 and to produce a weakened metal portion around opening 34 which may crack or fracture during installation or after a period of time. The construction of the upset wall, fillet of uniform curvature, and weld 39 serves to effectively prevent distortion of opening 34 and the creation of stress cracks or metal failures at that area.

Figure 5:
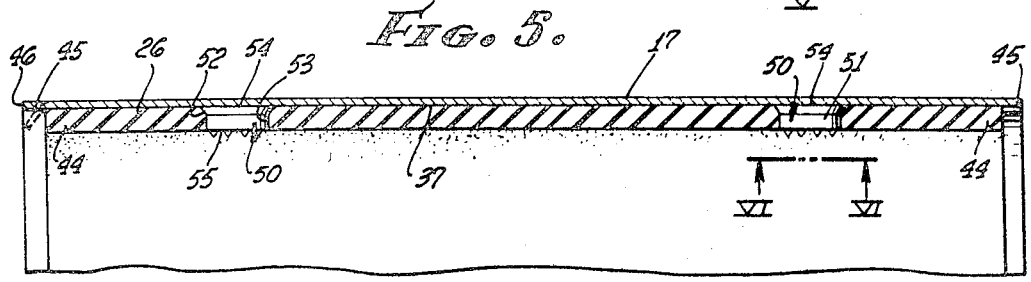
FIG. 5 is a fragmentary sectional view taken in the plane indicated by line V—V of FIG. 4.
Figure 6:
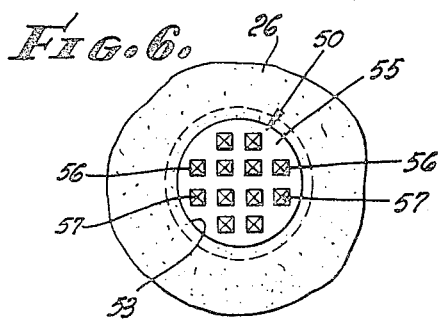
FIG. 6 is a fragmentary view taken in the plane indicated by line VI—VI of FIG. 5.
Figure 8:
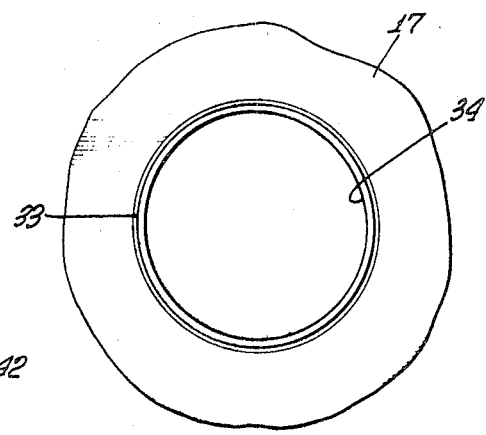
FIG. 8 is a plan view of the metal band with an upset wall formed in accordance with this invention.

The gasket member 26 made of flowable resilient material serves to provide a full and complete seal around pipe 14 and tightly resiliently envelopes pipe 14 when the clamp means is tightened. Since the material of gasket member 26 has a tendency to flow under compression, side edge portions 44 (FIG. 5) tend to flow axially along the pipe surface and to be extruded from beneath the side edges 45 of band 17. Such extrusion is subject to more rapid deterioration and tends to decrease the effectiveness of the seal at the side edges of the clamp device. Means for limiting such axial flow and for providing a tighter seal at side edges of the flexible band comprises the provision of a gasket member having a width slightly less than the width of band 17 so that side edge portions 44 are spaced inwardly from the outer side edge face 46 of the metal band 17. Thus, when are band 17 is drawn tight and the gasket member 26 tends to flow axially, side edges 45 of band 17 are drawn by the tensile forces applied thereto radially inwardly and deflected as shown at the left side of FIG. 5. Such radial inward deflection of side edges 45 confines axial flow of gasket member 26 and at the same time provides for a somewhat tighter circumferential seal against pipe 14 at side edge portions 44 of gasket member 26.

Means are also provided for continuous electrical conductivity from one pipe to another pipe, in this example from the main line 14 to the service pipe connected to outlet member 30. In other pipe clamp devices the continuity of electrical conductivity may be provided between adjacent pipe ends. In this example, button means 50 are carried by the clamp device 10 to provide an electrical path between pipe 14 to band 17. Buttons 50 may be provided in pairs on opposite sides of the transverse center line of band 17 and spaced inwardly from side edges 45 a suitable selected distance. Each button 50 is made of suitable conductive metal material and comprises a disk-like body 51 having an outwardly flaring base flange 52. Body 51 and flange 52 may be received within a port 53 in gasket member 26, the outwardly flaring and extending flange 52 serving to seat button 50 in said port with its outwardly directed face 54 in tight contact with the internal surface 37 of the band 17. Inwardly directed flat face 55 is provided with a plurality of spaced projections 56 in suitable arrangement and having pointed ends 57 adapted to bite into and conductivity contact the exterior surface of pipe 14. Such projections 56 have sufficient length to penetrate foreign matter such as rust or corrosion on the surface of pipe 14.

It will thus be understood that when it is desired to pass an electrical current through pipe 14 for purposes of thawing said pipe in cold climates but such electrical current is passed from pipe 14 through buttons 50 to band 17 and to a service pipe in the above example. When the buttons are employed on other types of repair clamps, it will be apparent that the electrical current will be passed through the buttons and band 17 to the adjacent pipe end held by such pipe clamp device.

Spanning the joint or space between opposed clamp members 20 is a metal shim 60 extending longitudinally of the pipe and of the clamp members. Shim 60 includes a central portion 61 of selected width to substantially underly each clamp member 20 between ends of band 17 and the gasket 26. End shim portions 62 taper toward end extremities of the shim, such taper commencing approximately beneath clamp lugs 22. The tapered end portions 62 serve the purpose of gradually progressively increasing pressure per unit of area towards the ends of the shim when the clamp means is tightened. Such tapered configuration and increase in pressure at ends of the shim serves to facilitate flow of gasket material at end margins of the gasket during tightening and also provides a circumferential pressure area at ends of the clamp means which is slightly greater than between the ends of the clamp means. Thus, a tight full seal is provided at end extremities of the clamp means. The shim also serves to provide a more uniform tightening pressure on the gasket when the clamp members are drawn together.

Since the outlet connection of clamp means 10 is provided on a clamp means which provides a full and complete seal about a pipe, it will be apparent that if the pipe is broken at the service outlet, the present clamp means may be employed to repair the pipe and re-establish the service connection without the attendant disadvantage of moving the service connection to another point spaced from the broken section of the pipe.

I claim:

1. A service side outlet means for connecting a main pipe line with a service pipe line comprising: a flexible metal band having a selected width and a selected radius of curvature about a band axis; means providing a circular hole of selected diameter in said band, said latter means including an upset wall integral with said band and joining said band with a fillet of uniform radius, said upset wall including a top edge face disposed generally normal to a radius of said curved band; and a cylindrical internally threaded member having one end portion received within said hole in press fitting relation to said upset wall; and weld means at said top edge face for securing said threaded member to said upset wall.

2. An outlet means as stated in claim 1 wherein said upset wall is disposed generally parallel to said radius of said curved band.

3. An outlet means as stated in claim 1 wherein the end portion of said cylindrical member is positioned in spaced relation to the projection of the internal surface of said band across said hole.

4. An outlet means as stated in claim 1 including a gasket member carried by said flexible metal band on the internal surface of said band, said gasket member having a circular port aligned with said hole.

5. In a pipe clamp device including metal band means and clamp means at ends of said band means for drawing said band means tightly about a cylindrical pipe, the provision of: an internal surface on said band means of selected width and curvature; a gasket member of resilient flowable material on said surface, said gasket member having a width less than the width of said band surface and having edges spaced from corresponding edges of said band means whereby edge portions of said band means project beyond said gasket member; said edge portions being deformable radially inward upon tightening of said clamping means whereby flow of material of said gasket member is limited.

6. A clamping device as stated in claim 5 wherein said band means includes a plurality of band members each having a clamp means at its end cooperable with clamp means of an adjacent band end; said gasket member having an end portion extending between adjacent ends of said band members; and a metal shim member between said gasket end portion and ends of said adjacent band members, said shim member having a central portion of uniform width and end portions of tapered shape, said tapered end portions serving to concentrate pressures at outer extremities of said gasket end portions to afford a tight circumferential seal at ends of said clamp means.

7. In a pipe clamp device including flexible metal band means, clamp means associated with said band means for drawing said band means tightly about a pipe, and a gasket member on said band means, the combination of means on said gasket member providing a plurality of spaced pairs of ports; metal buttons positioned in said ports, seated on said band surface, and having flange means engaged with said gasket member for holding said buttons in assembly with said gasket member, said buttons having inwardly directed faces with projections thereon adapted to engage a surface of a pipe end received within said pipe clamp to provide an electrically conductive connection between adjacent pipe ends through said metal band.

8. A device as stated in claim 7 wherein said inwardly directed faces on said buttons include pointed projections adapted to pierce non-conductive matter on the surface of a pipe.

References Cited
UNITED STATES PATENTS

| | | | |
|---|---|---|---|
| 1,057,708 | 4/1913 | Chapin | 285—197 |
| 1,690,220 | 11/1928 | Fahnestock | 339—95 |
| 2,250,280 | 7/1941 | Starbird. | |
| 2,788,231 | 4/1957 | Crow | 285—107 |
| 2,936,186 | 5/1960 | Dunmire | 285—373 |
| 3,204,665 | 9/1965 | Faint | 138—99 |
| 3,258,822 | 7/1966 | Schlesch et al. | 24—284 |

FOREIGN PATENTS 1,275,242  9/1961  France.

MARVIN A. CHAMPION, Primary Examiner

J. H. McGLYNN, Assistant Examiner